United States Patent [19]

Koll et al.

[11] 4,309,182
[45] Jan. 5, 1982

[54] LIQUID CRYSTAL PHASE OF AN AZO REACTIVE DYESTUFF AND ITS USE FOR DYEING AND PRINTING NATURAL AND SYNTHETIC SUBSTRATES

[75] Inventors: Jochen Koll, Odenthal; Volker Paulat, Monheim; Reinhold Hörnle, Cologne; Hans-Heinz Mölls; Konrad Nonn, both of Leverkusen, all of Fed. Rep. of Germany

[73] Assignee: Bayer Aktiengesellschaft, Leverkusen, Fed. Rep. of Germany

[21] Appl. No.: 208,595

[22] Filed: Nov. 19, 1980

[30] Foreign Application Priority Data

Nov. 30, 1979 [DE] Fed. Rep. of Germany ....... 2948293

[51] Int. Cl.³ ............... C09B 67/00; C09B 62/32; C09B 62/24
[52] U.S. Cl. .................................. 8/527; 8/437; 8/528; 8/549; 8/917; 8/918; 8/919; 260/154; 260/207.1; 544/356
[58] Field of Search ............... 8/527, 528, 549; 260/154; 544/356

[56] References Cited

U.S. PATENT DOCUMENTS 3,666,747 5/1972 Siegel et al. ................. 260/154

OTHER PUBLICATIONS

Hackh's Chemical Dictionary, Fourth Edition, (McGraw-Hill), 1972, p. 399.
John Griffiths' "Colour and Constitution of Organic Molecules" (Academic Press) 1976, p. 71.

Primary Examiner—A. Lionel Clingman
Attorney, Agent, or Firm—Sprung, Felfe, Horn, Lynch & Kramer

[57] ABSTRACT

Liquid finished formulations which are stable to storage and hydrolysis and are based on the lyotropic liquid crystal aqueous phase of the dyestuff of the formula

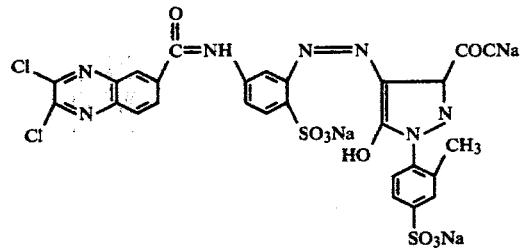

which is present in water in a concentration of 23–35% at room temperature, are outstandingly suitable for the preparation of dyebaths and printing pastes for dyeing cotton, wool, regenerated cellulose, paper and leather.

2 Claims, No Drawings

LIQUID CRYSTAL PHASE OF AN AZO REACTIVE DYESTUFF AND ITS USE FOR DYEING AND PRINTING NATURAL AND SYNTHETIC SUBSTRATES

The invention relates to the lyotropic liquid crystal aqueous phase of the dyestuff of the formula

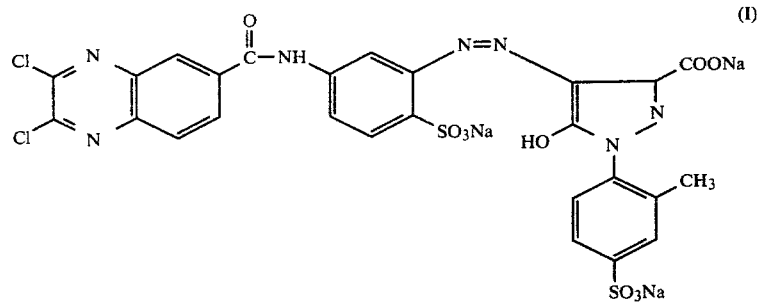

which is present in water in a concentration of 23–35% at room temperature, and the use of these lyotropic liquid crystals for the preparation of dyebaths and printing pastes for dyeing and/or printing natural and synthetic substrates, in particular cotton, wool, regenerated cellulose, paper and leather. This phase exhibits the birefringence and the formation of a structured diffraction pattern in small angle X-ray diffraction which are characteristic of liquid crystals. These lyotropic liquid crystals are characterised in the customary manner by the interference colours which form, as a result of the birefringence, when these liquid crystals are inserted between crossed nicols of a polarisation microscope, and/or by the structured diffraction pattern obtained by small angle X-ray diffraction with Cu-K α-radiation in a Kiessig chamber (compare, for example, G. H. Brown; Flüssige Kristalle (Liquid Crystals), Chem. uns. Zeit, 2, 1968, pages 43–51 and Eckert and Kramer; Pharmazie uns. Zeit, 1, 1972, pages 116–121).

The liquid crystal phase remains even when small amounts of inorganic salts, in particular sodium chloride, sodium sulphate or sodium acetate, or customary buffer mixtures and/or water-miscible organic solvents, such as alcohols, polyols, ethers or esters thereof and amides, and/or hydrotropic substances, such as urea, are added.

The physical form, according to the invention, of th dyestuff is obtained when the almost salt-free dyestuff of the formula I is liquefied with water within the abovementioned concentration range.

However, the new physical form can also be obtained directly if the aqueous solution or mixture of high salt content which is obtained in the customary synthesis is subjected to pressure permeation.

The new physical form, according to the invention, of the dyestuff is an exceptional liquid finished formulation which is stable to storage and hydrolysis.

EXAMPLE 28 g of the completely salt-free or almost salt-free dyestuff of the formula I are liquefied by stirring with 72 g of water at room temperature in the course of several hours. A highly concentrated, lyotropic liquid crystal phase which is stable to storage and to hydrolysis and which exhibits characteristic interference colours when inserted between crossed nicols in a polarisation microscope is obtained. It can, for example, be added directly to a dyebath for dyeing cellulose fibres by the exhaustion process. A brilliant yellow dyeing is obtained.

We claim:

1. Lyotropic liquid crystal phase of the dyestuff of the formula

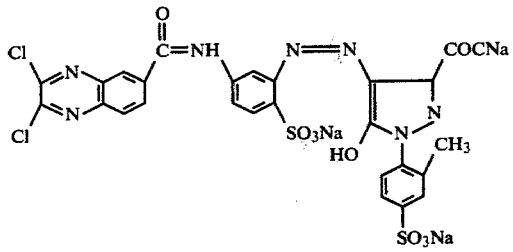

which is present in water in a concentration of 23–35% at room temperature.

2. A method for the preparation of dyebaths and printing pastes for dyeing and/or printing cotton, wool, regenerated cellulose, paper or leather which comprises using, as the dyestuff, the lyotropic liquid crystal phase of the dyestuff of claim 1.

* * * * *

UNITED STATES PATENT AND TRADEMARK OFFICE
CERTIFICATE OF CORRECTION

PATENT NO. : 4,309,182
DATED : Jan. 5, 1982
INVENTOR(S) : Jochen Koll et al

It is certified that error appears in the above–identified patent and that said Letters Patent are hereby corrected as shown below:

Title Page    Delete "COCNa" and insert --COONa--.
Abstract
formula

Col. 2, line 40   Delete "COCNa" and insert --COONa--.

Signed and Sealed this

Eighteenth Day of May 1982

[SEAL]

Attest:

GERALD J. MOSSINGHOFF

Attesting Officer    Commissioner of Patents and Trademarks